US011016572B2

United States Patent
Marijanovic et al.

(10) Patent No.: US 11,016,572 B2
(45) Date of Patent: May 25, 2021

(54) EFFICIENT DETECTION OF HUMAN MACHINE INTERFACE INTERACTION USING A RESONANT PHASE SENSING SYSTEM

(71) Applicant: Cirrus Logic International Semiconductor Ltd., Edinburgh (GB)

(72) Inventors: Srdjan Marijanovic, Austin, TX (US); Drew Kinney, Austin, TX (US); Luke Lapointe, Austin, TX (US); Siddharth Maru, Austin, TX (US); Tejasvi Das, Austin, TX (US); Anthony S. Doy, Austin, TX (US); Zhong You, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/875,006

(22) Filed: May 15, 2020

(65) Prior Publication Data

US 2020/0278753 A1 Sep. 3, 2020

Related U.S. Application Data

(63) Continuation of application No. 16/294,347, filed on Mar. 6, 2019, now Pat. No. 10,725,549.
(Continued)

(51) Int. Cl.
*G06F 3/044* (2006.01)
*G06F 3/01* (2006.01)
(Continued)

(52) U.S. Cl.
CPC .......... *G06F 3/016* (2013.01); *G01D 5/2026* (2013.01); *G01D 5/243* (2013.01); *G06F 3/044* (2013.01); *G06F 3/045* (2013.01); *G06F 3/0416* (2013.01)

(58) Field of Classification Search
CPC ...... G01D 5/2026; G01D 5/243; G06F 3/016; G06F 3/0416; G06F 3/044; G06F 3/045
(Continued)

(56) References Cited

U.S. PATENT DOCUMENTS 4,888,554 A 12/1989 Hyde et al.
5,286,941 A 2/1994 Bel
(Continued)

FOREIGN PATENT DOCUMENTS

DE 4004450 A1 8/1991
DE 102015215330 A1 2/2017
(Continued)

OTHER PUBLICATIONS

Combined Search and Examination Report under Sections 17 and 18(3), UKIPO, Application No. GB2001341.3, dated Jun. 29, 2020.
(Continued)

*Primary Examiner* — Tony O Davis
(74) *Attorney, Agent, or Firm* — Jackson Walker L.L.P.

(57) ABSTRACT

A system may include a tactile actuator for providing tactile feedback and a resonant phase sensing system. The resonant phase sensing system may include a resistive-inductive-capacitive sensor and a measurement circuit communicatively coupled to the resistive-inductive-capacitive sensor and the tactile actuator. The resistive-inductive-capacitive sensor may be configured to measure phase information associated with the resistive-inductive-capacitive sensor, based on the phase information, detect an indication of human interaction with the system proximate to the resistive-inductive-capacitive sensor, and trigger the tactile actuator to generate tactile feedback responsive to detecting the indication of human interaction.

16 Claims, 2 Drawing Sheets

Related U.S. Application Data

(60) Provisional application No. 62/649,857, filed on Mar. 29, 2018, provisional application No. 62/721,134, filed on Aug. 22, 2018, provisional application No. 62/739,970, filed on Oct. 2, 2018, provisional application No. 62/740,107, filed on Oct. 2, 2018.

(51) Int. Cl.
   *G06F 3/041* (2006.01)
   *G06F 3/045* (2006.01)
   *G01D 5/20* (2006.01)
   *G01D 5/243* (2006.01)

(58) Field of Classification Search
   USPC .................................................. 345/170–178
   See application file for complete search history.

(56) References Cited

U.S. PATENT DOCUMENTS

| | | | |
|---|---|---|---|
| 5,898,136 | A | 4/1999 | Katsurahira |
| 6,231,520 | B1* | 5/2001 | Maezawa ............ A61B 5/0051 600/552 |
| 6,380,923 | B1 | 4/2002 | Fukumoto et al. |
| 8,384,378 | B2* | 2/2013 | Feldkamp ............ A61B 5/053 324/236 |
| 8,421,446 | B2 | 4/2013 | Straubinger et al. |
| 9,707,502 | B1* | 7/2017 | Bonifas ................ G01D 5/142 |
| 10,168,855 | B2 | 1/2019 | Baughman et al. |
| 10,642,435 | B2 | 5/2020 | Maru et al. |
| 10,726,715 | B2 | 7/2020 | Hwang et al. |
| 2003/0038624 | A1 | 2/2003 | Hilliard et al. |
| 2005/0192727 | A1 | 9/2005 | Shostak et al. |
| 2005/0258826 | A1 | 11/2005 | Kano et al. |
| 2006/0025897 | A1 | 2/2006 | Shostak et al. |
| 2007/0198926 | A1* | 8/2007 | Joguet .................... G06F 3/041 715/702 |
| 2008/0150905 | A1* | 6/2008 | Grivna ................. G06F 3/0446 345/173 |
| 2009/0058430 | A1 | 3/2009 | Zhu |
| 2009/0140728 | A1 | 6/2009 | Rollins et al. |
| 2009/0278685 | A1 | 11/2009 | Potyrailo et al. |
| 2010/0045360 | A1 | 2/2010 | Howard et al. |
| 2010/0153845 | A1 | 6/2010 | Gregorio et al. |
| 2010/0211902 | A1 | 8/2010 | Unsworth et al. |
| 2010/0231239 | A1 | 9/2010 | Tateishi et al. |
| 2010/0238121 | A1* | 9/2010 | Ely ......................... G06F 3/044 345/173 |
| 2010/0328249 | A1* | 12/2010 | Ningrat ................ G06F 3/0447 345/174 |
| 2011/0005090 | A1 | 1/2011 | Lee et al. |
| 2011/0216311 | A1 | 9/2011 | Kachanov et al. |
| 2011/0267302 | A1 | 11/2011 | Fasshauer |
| 2011/0291821 | A1* | 12/2011 | Chung ................... G06F 3/0416 340/407.2 |
| 2011/0301876 | A1* | 12/2011 | Yamashita ............ B25J 13/084 702/41 |
| 2013/0018489 | A1* | 1/2013 | Grunthaner .......... H03K 17/975 700/73 |
| 2013/0076374 | A1 | 3/2013 | Huang |
| 2013/0106756 | A1* | 5/2013 | Kono ..................... G06F 3/041 345/173 |
| 2013/0106769 | A1* | 5/2013 | Bakken .................. G06F 3/044 345/174 |
| 2013/0269446 | A1 | 10/2013 | Fukushima et al. |
| 2014/0002113 | A1 | 1/2014 | Schediwy et al. |
| 2014/0028327 | A1 | 1/2014 | Potyrailo et al. |
| 2014/0225599 | A1 | 8/2014 | Hess |
| 2014/0267065 | A1* | 9/2014 | Levesque ............... G06F 3/0488 345/173 |
| 2015/0022174 | A1 | 1/2015 | Nikitin |
| 2015/0077094 | A1 | 3/2015 | Baldwin et al. |
| 2015/0084874 | A1 | 3/2015 | Cheng et al. |
| 2015/0293695 | A1 | 10/2015 | Schonleben et al. |
| 2015/0329199 | A1* | 11/2015 | Golborne ................ B64C 27/57 244/196 |
| 2016/0018940 | A1 | 1/2016 | Lo et al. |
| 2016/0048256 | A1* | 2/2016 | Day ..................... H03K 17/945 345/174 |
| 2016/0117084 | A1 | 4/2016 | Ording |
| 2016/0162031 | A1 | 6/2016 | Westerman et al. |
| 2016/0179243 | A1 | 6/2016 | Schwartz |
| 2016/0231874 | A1 | 8/2016 | Baughman et al. |
| 2016/0252403 | A1 | 9/2016 | Murakami |
| 2016/0357296 | A1 | 12/2016 | Picciatto et al. |
| 2017/0077735 | A1 | 3/2017 | Leabman |
| 2017/0093222 | A1 | 3/2017 | Joye et al. |
| 2017/0140644 | A1 | 5/2017 | Hwang et al. |
| 2017/0147068 | A1* | 5/2017 | Yamazaki ........... G06F 3/04812 |
| 2017/0168578 | A1* | 6/2017 | Tsukamoto ............ G06F 3/02 |
| 2017/0185173 | A1 | 6/2017 | Ito et al. |
| 2017/0187541 | A1* | 6/2017 | Sundaresan ......... G01N 27/026 |
| 2017/0237293 | A1 | 8/2017 | Faraone et al. |
| 2017/0282715 | A1 | 10/2017 | Fung et al. |
| 2017/0328740 | A1 | 11/2017 | Widmer et al. |
| 2017/0371380 | A1 | 12/2017 | Oberhauser et al. |
| 2017/0371381 | A1 | 12/2017 | Liu |
| 2017/0371473 | A1 | 12/2017 | David et al. |
| 2018/0019722 | A1 | 1/2018 | Birkbeck |
| 2018/0055448 | A1 | 3/2018 | Karakaya et al. |
| 2018/0088064 | A1* | 3/2018 | Potyrailo ............. G01N 27/221 |
| 2018/0135409 | A1 | 5/2018 | Wilson et al. |
| 2018/0182212 | A1* | 6/2018 | Li .......................... G05D 19/02 |
| 2018/0183372 | A1* | 6/2018 | Li .......................... G06F 3/0414 |
| 2018/0195881 | A1 | 7/2018 | Acker |
| 2018/0221796 | A1* | 8/2018 | Bonifas ................ B01D 35/143 |
| 2018/0229161 | A1* | 8/2018 | Maki .................... B01D 27/101 |
| 2018/0231485 | A1* | 8/2018 | Potyrailo ............. G01N 27/026 |
| 2018/0260049 | A1* | 9/2018 | O'Lionaird .......... G06F 1/1692 |
| 2018/0260050 | A1 | 9/2018 | Unseld et al. |
| 2018/0321748 | A1* | 11/2018 | Rao ...................... G06F 3/0416 |
| 2019/0179146 | A1 | 6/2019 | De Nardi |
| 2019/0197218 | A1 | 6/2019 | Schwartz |
| 2019/0204929 | A1 | 7/2019 | Attari et al. |
| 2019/0235629 | A1* | 8/2019 | Hu ........................ H01L 41/09 |
| 2019/0302161 | A1* | 10/2019 | You ..................... G01R 27/267 |
| 2019/0302193 | A1* | 10/2019 | Maru ................... G01D 5/202 |
| 2019/0302890 | A1 | 10/2019 | Marijanovic et al. |
| 2019/0302922 | A1* | 10/2019 | Das ....................... G06F 3/0416 |
| 2019/0302923 | A1* | 10/2019 | Maru ................... G06F 3/045 |
| 2019/0339313 | A1 | 11/2019 | Vandermeijden |
| 2019/0377468 | A1 | 12/2019 | Micci et al. |
| 2020/0064160 | A1* | 2/2020 | Maru .................. H03K 17/9522 |
| 2020/0133455 | A1* | 4/2020 | Sepehr ................. G06F 3/0418 |
| 2020/0177290 | A1 | 6/2020 | Reimer et al. |
| 2020/0191761 | A1* | 6/2020 | Potyrailo ............. G01N 27/122 |
| 2020/0271477 | A1* | 8/2020 | Kost ...................... G01D 5/24 |
| 2020/0271706 | A1* | 8/2020 | Wardlaw ............. G01R 27/2605 |
| 2020/0271745 | A1* | 8/2020 | Das ........................ G01R 23/02 |
| 2020/0272301 | A1* | 8/2020 | Duewer ................ G06F 3/04184 |
| 2020/0319237 | A1* | 10/2020 | Maru .................... G01R 27/28 |

FOREIGN PATENT DOCUMENTS

| | | |
|---|---|---|
| DE | 102015215331 A1 | 2/2017 |
| EP | 1697710 B1 | 4/2007 |
| EP | 2682843 A1 | 1/2014 |
| GB | 2573644 A | 11/2019 |
| JP | 2006246289 A | 9/2006 |
| WO | 00/33244 A2 | 6/2000 |
| WO | 2006135483 A2 | 12/2006 |
| WO | 2007068283 A1 | 6/2007 |
| WO | 2016032704 A1 | 3/2016 |

OTHER PUBLICATIONS

International Search Report and Written Opinion of the International Searching Authority, International Application No. PCT/US2019/045554, dated Oct. 17, 2019.

Combined Search and Examination Report, UKIPO, Application No. GB1904250.6, dated Sep. 10, 2019.

(56) References Cited

OTHER PUBLICATIONS

International Search Report and Written Opinion of the International Searching Authority, International Application No. PCT/US2019/022518, dated May 24, 2019.
International Search Report and Written Opinion of the International Searching Authority, International Application No. PCT/US2019/022578, dated May 27, 2019.
International Search Report and Written Opinion of the International Searching Authority, International Application No. PCT/US2019/021838, dated May 27, 2019.
International Search Report and Written Opinion of the International Searching Authority, International Application No. PCT/US2020/059113, dated Feb. 23, 2021.
International Search Report and Written Opinion of the International Searching Authority, International Application No. PCT/US2020/059101, dated Mar. 9, 2021.

\* cited by examiner

EFFICIENT DETECTION OF HUMAN MACHINE INTERFACE INTERACTION USING A RESONANT PHASE SENSING SYSTEM

RELATED APPLICATIONS

The present disclosure is a continuation of U.S. Nonprovisional patent application Ser. No. 16/294,347, filed Mar. 6, 2019, which claims priority to U.S. Provisional Patent Application Ser. No. 62/739,970, filed Oct. 2, 2018, U.S. Provisional Patent Application Ser. No. 62/649,857, filed Mar. 29, 2018, U.S. Provisional Patent Application Ser. No. 62/721,134, filed Aug. 22, 2018, and U.S. Provisional Patent Application Ser. No. 62/740,107, filed Oct. 2, 2018, all of which are incorporated by reference herein in their entireties.

FIELD OF DISCLOSURE

The present disclosure relates in general to electronic devices with user interfaces (e.g., mobile devices, game controllers, instrument panels, etc.), and more particularly, an integrated haptic system for use in a system for mechanical button replacement in a mobile device, for use in haptic feedback for inductive and capacitive sensors, and/or other suitable applications.

BACKGROUND

Linear resonant actuators (LRAs) and other vibrational actuators (e.g., rotational actuators, vibrating motors, etc.) are increasingly being used in mobile devices (e.g., mobile phones, personal digital assistants, video game controllers, etc.) to generate vibrational feedback for user interaction with such devices. Typically, a force/pressure sensor detects user interaction with the device (e.g., a finger press on a virtual button of the device) and in response thereto, the linear resonant actuator vibrates to provide feedback to the user. For example, a linear resonant actuator may vibrate in response to force to mimic to the user the feel of a mechanical button click.

One disadvantage of existing haptic systems is that existing approaches to processing of signals of a force sensor and generating of a haptic response thereto often have longer than desired latency, such that the haptic response may be significantly delayed from the user's interaction with the force sensor. Thus, in applications in which a haptic system is used for mechanical button replacement, inductive or capacitive sensor feedback, or other application, and the haptic response may not effectively mimic the feel of a mechanical button click. Accordingly, systems and methods that minimize latency between a user's interaction with a force sensor and a haptic response to the interaction are desired.

In addition, to create appropriate and pleasant haptic feelings for a user, a signal driving a linear resonant actuator may need to be carefully designed and generated. In mechanical button replacement application, a desirable haptic response may be one in which the vibrational impulse generated by the linear resonant actuator should be strong enough to give a user prominent notification as a response to his/her finger pressing and/or releasing, and the vibrational impulse should be short, fast, and clean from resonance tails to provide a user a "sharp" and "crisp" feeling. Optionally, different control algorithms and stimulus may be applied to a linear resonant actuator, to alter the performance to provide alternate tactile feedback possibly denoting certain user modes in the device giving more "soft" tactile responses.

SUMMARY

In accordance with the teachings of the present disclosure, the disadvantages and problems associated with sensing of human-machine interface interactions in a mobile device may be reduced or eliminated.

In accordance with embodiments of the present disclosure, a system may include a tactile actuator for providing tactile feedback and a resonant phase sensing system. The resonant phase sensing system may include a resistive-inductive-capacitive sensor and a measurement circuit communicatively coupled to the resistive-inductive-capacitive sensor and the tactile actuator. The resistive-inductive-capacitive sensor may be configured to measure phase information associated with the resistive-inductive-capacitive sensor, based on the phase information, detect an indication of human interaction with the system proximate to the resistive-inductive-capacitive sensor, and trigger the tactile actuator to generate tactile feedback responsive to detecting the indication of human interaction.

In accordance with these and other embodiments of the present disclosure, a method may include measuring phase information associated with a resistive-inductive-capacitive sensor, detecting an indication of human interaction with the resistive-inductive-capacitive sensor based on the phase information, and triggering a tactile actuator to generate tactile feedback responsive to detecting the indication of human interaction.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
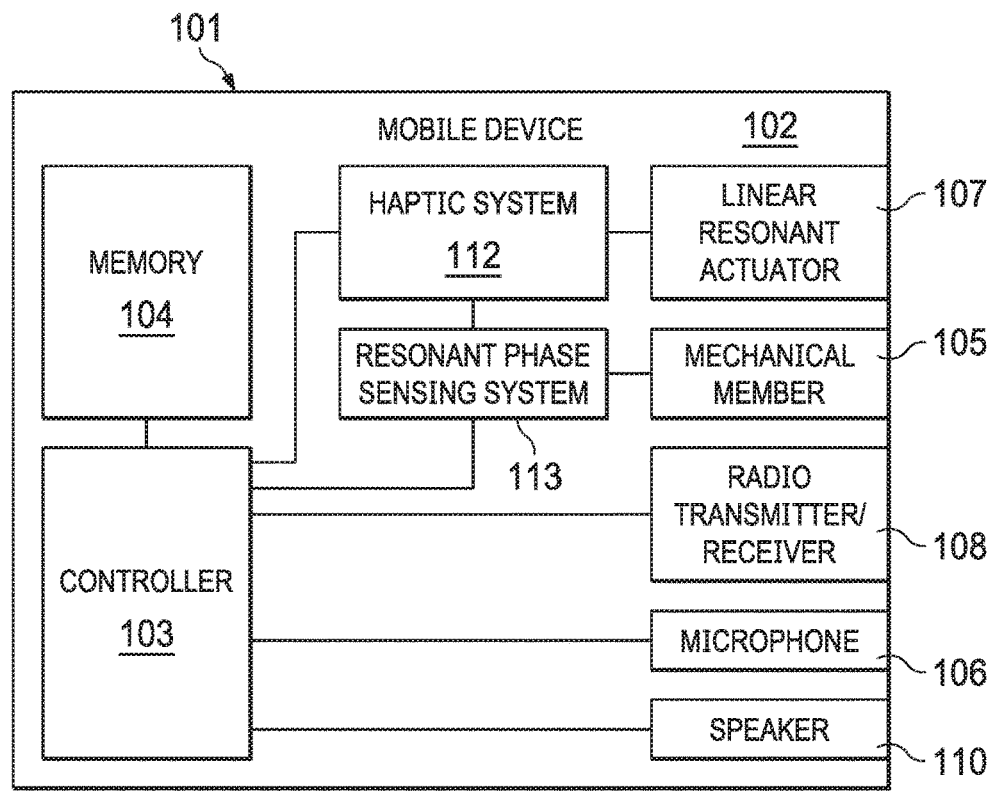
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a mechanical member 105, a microphone 106, a linear resonant actuator 107, a radio transmitter/receiver 108, a speaker 110, a haptic system 112, and a resonant phase sensing system 113.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a coil to move axially through a cylindrical magnetic gap. When an electrical signal is applied to the coil, a magnetic field is created by the electric current in the coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Mechanical member 105 may be housed within or upon enclosure 101, and may include any suitable system, device, or apparatus configured such that all or a portion of mechanical member 105 displaces in position responsive to a force, a pressure, or a touch applied upon or proximately to mechanical member 105. In some embodiments, mechanical member 105 may be designed to appear as a mechanical button on the exterior of enclosure 101.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current or voltage to drive a coil pressed against a moving mass connected to a spring. When the coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107, as well as the use of multiple actuators to render a haptic effect. As described elsewhere in this disclosure, a linear resonant actuator 107, based on a signal received from haptic system 112, may render haptic feedback to a user of mobile device 102 for at least one of mechanical button replacement and capacitive or inductive sensor feedback.

Together, mechanical member 105 and linear resonant actuator 107, along with suitable control functions of controller 103, memory 104, haptic system 112, and/or resonant phase sensing system 113, may form a human-interface device, such as a virtual button, which, to a user of mobile device 102, has a look and feel of a mechanical button of mobile device 102.

Figure 4:
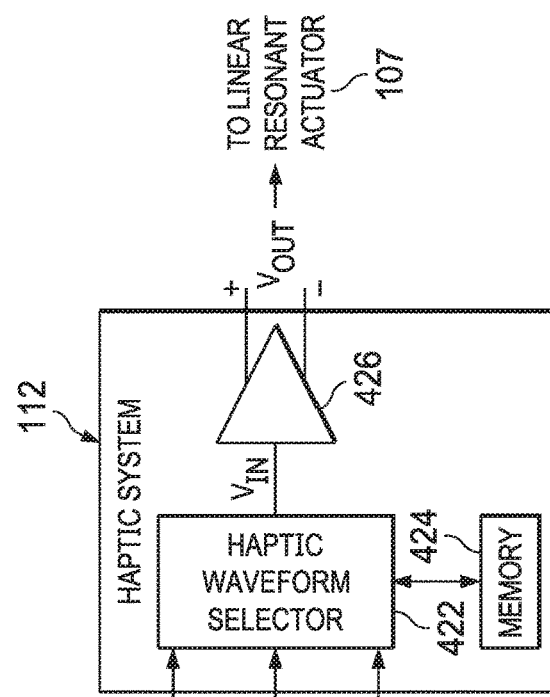
FIG. 4 illustrates a diagram of selected components of an example resonant phase sensing system and an example haptic system, in accordance with embodiments of the present disclosure.

Haptic system 112 may be housed within enclosure 101, may be communicatively coupled to resonant phase sensing system 113, linear resonant actuator 107, and controller 103, and may include any system, device, or apparatus configured to receive a signal from resonant phase sensing system 113 or controller 103 indicative of a human interaction with a human-machine interface implemented by mechanical member 105 and linear resonant actuator 107 and generate an electronic signal for driving linear resonant actuator 107 in response to the indication of the human interaction. Detail of an example integrated haptic system 112 in accordance with embodiments of the present disclosure is depicted in FIG. 4.

Resonant phase sensing system 113 may be housed within enclosure 101, may be communicatively coupled to mechanical member 105 and may include any system, device, or apparatus configured to detect a displacement of mechanical member 105 indicative of a physical interaction (e.g., by a user of mobile device 102) with the human-machine interface of mobile device 102 (e.g., a force applied by a human finger to a virtual button of mobile device 102). As described in greater detail below, resonant phase sensing system 113 may detect displacement of mechanical member 105 by performing resonant phase sensing of a resistive-inductive-capacitive sensor for which an impedance (e.g., inductance, capacitance, and/or resistance) of the resistive-inductive-capacitive sensor changes in response to displacement of mechanical member 105. Thus, mechanical member 105 may comprise any suitable system, device, or apparatus which all or a portion thereof may displace, and such displacement may cause a change in an impedance of a resistive-inductive-capacitive sensor integral to resonant phase sensing system 113. Resonant phase sensing system 113 may also generate an electronic signal for driving linear resonant actuator 107 in response to a physical interaction associated with a human-machine interface associated with mechanical member 105. Detail of an example resonant phase sensing system 113 in accordance with embodiments of the present disclosure is depicted in greater detail below. In addition, resonant phase sensing system 113 may be similar or identical in many respects to the resonant phase sensing systems disclosed in U.S. patent application Ser. No. 16/267,079, entitled "Resonant Phase Sensing of Resistive-Inductive-Capacitive Sensors" and filed on Feb. 4, 2019 (the "Reference Application"), which is incorporated herein by reference.

Although specific example components are depicted above in FIG. 1 as being integral to mobile device 102 (e.g., controller 103, memory 104, mechanical member 105, microphone 106, radio transmitter/receiver 108, speakers(s) 110, linear resonant actuator 107, etc.), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1, including but not limited to a keypad, a touch screen, and a display, thus allowing a user to interact with and/or otherwise manipulate mobile device 102 and its associated components. In addition, although FIG. 1 depicts only a single virtual button comprising mechanical member 105 and linear resonant actuator 107 for purposes of clarity and exposition, in some embodiments a mobile device 102 may have multiple virtual buttons each comprising a respective mechanical member 105 and linear resonant actuator 107.

Figure 2:
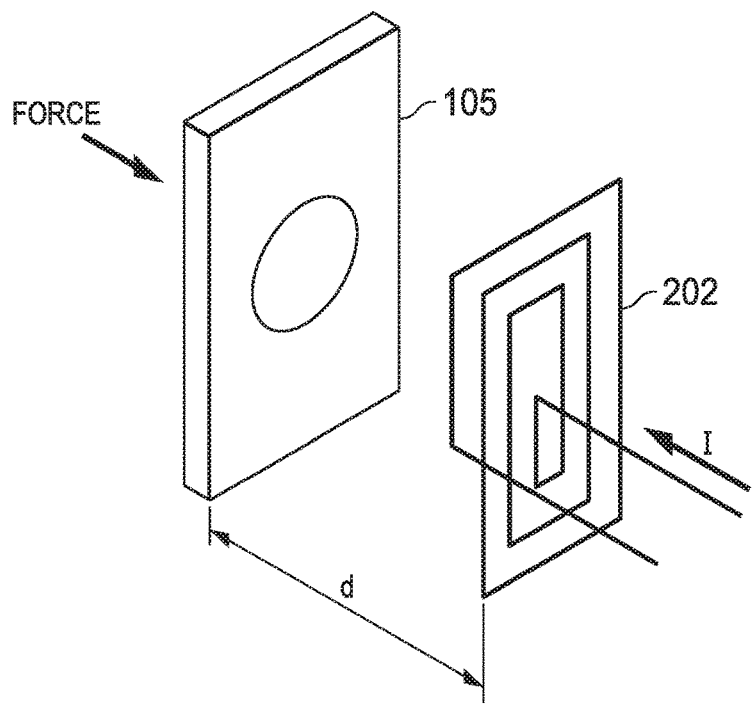
FIG. 2 illustrates a mechanical member separated by a distance from an inductive coil, in accordance with embodiments of the present disclosure.
Figure 3:
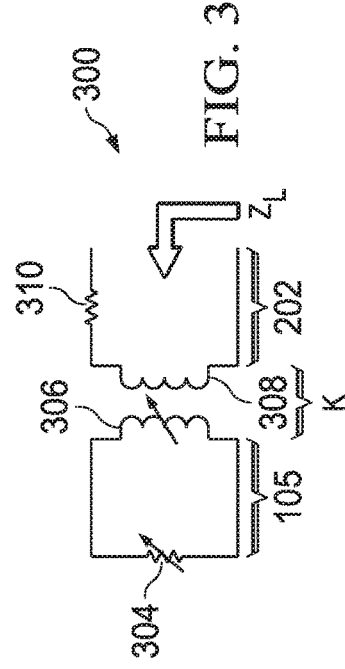
FIG. 3 illustrates selected components of an inductive sensing system that may be implemented by a resonant phase sensing system, in accordance with embodiments of the present disclosure.

FIG. 2 illustrates mechanical member 105 embodied as a metal plate separated by a distance d from an inductive coil 202, in accordance with embodiments of the present disclosure. FIG. 3 illustrates selected components of an inductive sensing system 300 that may be implemented by resonant phase sensing system 113, in accordance with embodiments of the present disclosure. As shown in FIG. 3, inductive sensing system 300 may include mechanical member 105, modeled as a variable electrical resistance 304 and a variable electrical inductance 306, and may include inductive coil 202 in physical proximity to mechanical member such that inductive coil 202 has a mutual inductance with mechanical member 105 defined by a variable coupling coefficient k. As shown in FIG. 3, inductive coil 202 may be modeled as a variable electrical inductance 308 and a variable electrical resistance 310.

In operation, as a current I flows through inductive coil 202, such current may induce a magnetic field which in turn may induce an eddy current inside mechanical member 105. When a force is applied to and/or removed from mechanical member 105, which alters distance d between mechanical member 105 and inductive coil 202, the coupling coefficient k, variable electrical resistance 304, and/or variable electrical inductance 306 may also change in response to the change in distance. These changes in the various electrical parameters may, in turn, modify an effective impedance $Z_L$ of inductive coil 202.

FIG. 4 illustrates a diagram of selected components of an example resonant phase sensing system 113, in accordance with embodiments of the present disclosure. In some embodiments, resonant phase sensing system 113 may be used to implement resonant phase sensing system 113 of FIG. 1. As shown in FIG. 4, resonant phase sensing system 113 may include a resistive-inductive-capacitive sensor 402 and a processing integrated circuit (IC) 412.

As shown in FIG. 4, resistive-inductive-capacitive sensor 402 may include sense inductor 302 (from FIG. 3), a resistor 404, and capacitor 406. Although shown in FIG. 4 to be arranged in parallel with one another, it is understood that sense inductor 302, resistor 404, and capacitor 406 may be arranged in any other suitable manner that allows resistive-inductive-capacitive sensor 402 to act as a resonant tank. For example, in some embodiments, sense inductor 302, resistor 404, and capacitor 406 may be arranged in series with one another. In some embodiments, resistor 404 may not be implemented with a stand-alone resistor, but may instead be implemented by a parasitic resistance of sense inductor 302, a parasitic resistance of capacitor 406, and/or any other suitable parasitic resistance.

Processing IC 412 may be communicatively coupled to resistive-inductive-capacitive sensor 402 and may comprise any suitable system, device, or apparatus configured to implement a measurement circuit to measure phase information associated with resistive-inductive-capacitive sensor 402 and based on the phase information, determine a displacement of mechanical member 105 relative to resistive-inductive-capacitive sensor 402. Thus, processing IC 412 may be configured to determine an occurrence of a physical interaction (e.g., press or release of a virtual button) associated with a human-machine interface associated with mechanical member 105 based on the phase information. Further, processing IC 412 may further be configured to communicate one or more output signals to haptic system 112 in order to trigger a haptic response to physical interaction associated with the human-machine interface.

As shown in FIG. 4, processing IC 412 may include a phase detector 414, a voltage-controlled oscillator (VCO) 416, a DSP 432, a loop filter 434, and a timer circuit 436. In some embodiments, phase detector 414 may comprise a coherent in-phase/quadrature demodulator implemented with an in-phase channel and a quadrature channel as detailed in the Reference Application. In operation, phase detector 414 may process sensor signal φ to determine phase information associated with resistive-inductive-capacitive sensor 402. VCO 416 may generate an oscillation signal to be used as a basis for the signal that drives resistive-inductive-capacitive sensor 402, as well as the oscillation signals used by mixers of phase detector 414 to extract in-phase and quadrature components of amplified sensor signal ϕ. The oscillation frequency of the oscillation signal generated by VCO 416 may be selected based on a resonant frequency of resistive-inductive-capacitive sensor 402 (e.g., may be approximately equal to the resonant frequency of resistive-inductive-capacitive sensor 402).

Loop filter 434 may comprise a low-pass filter configured to low-pass filter one or more output signals generated by phase detector 414, and such filtered output signal may be applied to VCO 416 to modify the frequency of the oscillation signal generated by VCO 416, in order to drive sensor signal ϕ towards indicating a phase shift of zero. As a result, sensor signal ϕ may comprise a transient decaying signal in response to a "press" of a virtual button associated with resonant phase sensing system 113 as well as another transient decaying signal in response to a subsequent "release" of the virtual button. Accordingly, loop filter 434 in connection with VCO 416 may implement a feedback control loop that may track changes in operating parameters of resonant phase sensing system 113 by modifying the driving frequency of VCO 416.

DSP 432 may include any system, device, or apparatus configured to interpret and/or execute program instructions and/or process data. In particular, DSP 432 may receive phase information from phase detector 414 and/or loop filter 434, and based on such phase information, determine a displacement of mechanical member 105 relative to resistive-inductive-capacitive sensor 402, which may be indicative of an occurrence of a physical interaction (e.g., press or release of a virtual button) associated with a human-machine interface associated with mechanical member 105 based on the phase information. DSP 432 may also generate one or more output signals (e.g., shown in FIG. 4 as control signals GPIO, CONTROL DATA, and SENSOR DATA) indicative of the phase information and/or displacement.

In order to minimize power consumption associated with operating resonance phase sensing system 113, resonance phase sensing system 113 may include timer circuit 436. Timer circuit 436 may comprise any suitable system, device, or apparatus configured to periodically activate resonant phase sensing system 113, or individual components of resonant phase sensing system 113, such that resonant phase sensing system 113 periodically detects the indication of human interaction. In addition, the various components of resonant phase sensing system 113 (e.g., resistive-inductive-capacitive sensor 402, phase detector 414, VCO 416, loop filter 434, DSP 432) may be thought of as stages of resonant phase sensing system 113, and timer circuit 436 may be configured to activate at least one stage of the plurality of stages based on one or more outputs of one or more stages of the plurality of stages which precede the at least one stage. For example, if significant signal change is detected from resistive-inductive-capacitive sensor 402, timer circuit 436 may activate analog-to-digital converters of phase detector 414 and loop filter 434. Then, DSP 432 may be activated when resistive-inductive-capacitive sensor 402 has completed data acquisition and the feedback loop of VCO 416 and loop filter 434 has settled. Subsequently, haptic system 112 and linear resonant actuator 107 may be activated responsive to DSP 432 determining that a human interaction with the human-machine interface of mobile device 102 has taken place.

As shown in FIG. 4, haptic system 112 may include haptic waveform selector 422, a memory 424, and an amplifier 426.

Haptic waveform selector 422 may comprise any suitable system, device, or apparatus configured to receive one or more signals (e.g., shown in FIG. 4 as control signals GPIO, CONTROL DATA, and SENSOR DATA) from resonant phase sensing system 113 and/or applications processor 420, and based on such one or more signals, select a haptic playback waveform from memory 424 and communicate such haptic playback waveform to amplifier 426 for playback to linear resonant actuator 107. Haptic waveform selector 422 may be implemented by a processor, controller, application-specific integrated circuit, field-programmable gate array, or any other suitable circuit.

Memory 424 may be communicatively coupled to haptic waveform selector 422, and may include any system, device, or apparatus configured to retain program instructions and/or data for a period of time (e.g., computer-readable media). Memory 424 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off. Memory 424 may store one or more haptic playback waveforms. In some embodiments, each of the one or more haptic playback waveforms may define a haptic response as a desired acceleration of a linear resonant actuator (e.g., linear resonant actuator 107) as a function of time.

Amplifier 426 may be electrically coupled to haptic waveform selector 422 and may comprise any suitable electronic system, device, or apparatus configured to increase the power of an input signal $V_{IN}$ (e.g., a time-varying voltage or current) to generate an output signal $V_{OUT}$. For example, amplifier 426 may use electric power from a power supply (not explicitly shown) to increase the amplitude of a signal. Amplifier 426 may include any suitable amplifier class, including without limitation, a Class-D amplifier.

In operation, haptic waveform selector 422 may receive one or more control signals from resonant phase sensing system 113 (or applications processor 420) indicative of human interaction with the human-machine interface implemented by mechanical member 105 and linear resonant actuator 107. In response to the one or more control signals indicating human interaction with the human-machine interface implemented by mechanical member 105 and linear resonant actuator 107, haptic waveform selector 422 may retrieve a haptic playback waveform from memory 424 and process such haptic playback waveform to determine a processed haptic playback signal $V_{IN}$. In some embodiments, haptic waveform selector 422 may ignore the contents of memory 424 and a haptic playback waveform directly from applications processor 420. In embodiments in which amplifier 426 is a Class D amplifier, processed haptic playback signal $V_{IN}$ may comprise a pulse-width modulated signal. In response to the one or more control signals indicating human interaction with the human-machine interface implemented by mechanical member 105 and linear resonant actuator 107, haptic waveform selector 422 may cause processed haptic playback signal $V_{IN}$ to be output to amplifier 426, and amplifier 426 may amplify processed haptic playback signal $V_{IN}$ to generate a haptic output signal $V_{OUT}$ for driving linear resonant actuator 107.

In some embodiments, haptic system 112 and resonance phase sensing system 113 may be formed on a single integrated circuit, thus enabling lower latency than existing approaches to haptic feedback control. By providing haptic system 112 and resonance phase sensing system 113 as part of a single monolithic integrated circuit, latencies between various interfaces and system components of integrated haptic system 112 and resonance phase sensing system 113 may be reduced or eliminated.

As shown in FIG. 4, haptic system 112 may be communicatively coupled to and may be configured to receive one or more control signals from applications processor 420. In some embodiments, applications processor 420 may be implemented by controller 103. However, despite an ability of applications processor 420 to process signals from resonant phase sensing system 113 in order to generate control signals for haptic system 112, the ability to bypass applications processor 420 to allow haptic system 112 to operate based on one or more control signals from resonant phase sensing system 113 may reduce latency, reduce power consumption, and have other positive effects as compared to control of haptic system 113 by applications processor 420. For instance, by offloading of control of haptic driver signals DSP 432, mobile device 102 may be optimized for low-power and low-latency performance for generating haptic feedback response.

As another example, in an effort to minimize the power consumption of mobile device 102 for always-on operation, haptic system 112 may be configured to monitor control signals from a resonant phase sensing system 113 for indicating a user input. However, once an initial user input has been detected, the power and resources of applications processor 420 may be used to provide more detailed signal analysis and response. Thus, resonant phase sensing system 113 may be configured to trigger linear resonant actuator 107 to generate haptic feedback responsive to detecting an indication of human interaction while bypassing one or more other processing elements (e.g., applications processor 420) of mobile device 102 that require additional processing latency and/or power consumption in order to process the human interaction.

In some embodiments, resonant phase sensing system 113 may be configured to determine a force of a sensed human interaction and/or a duration of a sensed human interaction. Based on such sensed force and/or duration, resonant phase sensing system 113 and/or haptic system 112 may be configured to vary a pattern and/or an intensity of the tactile feedback generated.

The foregoing contemplates providing haptic feedback to a user via a linear resonant actuator. However, the systems and methods disclosed herein may be applied to any suitable tactile actuator, including without limitation a linear resonant actuator or any other vibrational actuator.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A circuit configured to:
   measure phase information associated with a resistive-inductive-capacitive sensor;
   based on the phase information, detect an indication of human interaction proximate to the resistive-inductive-capacitive sensor, wherein the human interaction is a mechanical force applied proximate to the resistive-inductive-capacitive sensor; and
   trigger generation of human-perceptible feedback responsive to detecting the indication of human interaction.

2. The circuit of claim 1, further comprising a timer circuit configured to periodically activate a resonant phase sensing system comprising the resistive-inductive-capacitive sensor to detect the indication of human interaction.

3. The circuit of claim 2, wherein the resonant phase sensing system has a plurality of stages, and wherein the timer circuit is configured to activate at least one stage of the plurality of stages based on one or more outputs of one or more stages of the plurality of stages which precede the at least one stage.

4. The circuit of claim 1, further configured to trigger the generation of the human-perceptible feedback responsive to detecting the indication of human interaction while bypassing one or more other processing elements of a resonant phase sensing system comprising the resistive-inductive-capacitive sensor that require additional processing latency and/or power consumption in order to process the human interaction.

5. The circuit of claim 4, wherein the one or more other processing elements comprise an applications processor.

6. The circuit of claim 1, further comprising a local digital signal processor to process detection of the human interaction and trigger the generation of the human-perceptible feedback.

7. The circuit of claim 6, further configured to generate the human-perceptible feedback with varying patterns or intensities based on at least one of a force of the human interaction sensed and a duration of the human interaction sensed.

8. The circuit of claim 1, wherein the generation of the human-perceptible feedback comprises generation of tactile feedback to a tactile actuator.

9. A method comprising:
measuring phase information associated with a resistive-inductive-capacitive sensor;
based on the phase information, detecting an indication of human interaction with the resistive-inductive-capacitive sensor, wherein the human interaction is a mechanical force applied proximate to the resistive-inductive-capacitive sensor; and
triggering generation of human-perceptible feedback responsive to detecting the indication of human interaction.

10. The method of claim 9, further comprising periodically activating, with a timer circuit, a resonant phase sensing system comprising the resistive-inductive-capacitive sensor to detect the indication of human interaction.

11. The method of claim 10, wherein the resonant phase sensing system has a plurality of stages, and wherein the method further comprises activating, with the timer circuit, at least one stage of the plurality of stages based on one or more outputs of one or more stages of the plurality of stages which precede the at least one stage.

12. The method of claim 9, wherein triggering comprises triggering the human-perceptible feedback responsive to detecting the indication of human interaction while bypassing one or more other processing elements of a resonant phase sensing system comprising the resistive-inductive-capacitive sensor that require additional processing latency and/or power consumption in order to process the human interaction.

13. The method of claim 12, wherein the one or more other processing elements comprise an applications processor.

14. The method of claim 9, further comprising processing, with a local digital signal processor of a resonant phase sensing system, detection of the human interaction and triggering generation of the human-perceptible feedback.

15. The method of claim 14, further comprising generating the human-perceptible feedback with varying patterns or intensities based on at least one of a force of the human interaction sensed and a duration of the human interaction sensed.

16. The method of claim 9, wherein generating the human-perceptible feedback comprises generating tactile feedback to a tactile actuator.

* * * * *